Oct. 23, 1951     W. H. WOODWARD     2,572,231
ADJUSTABLE BRACKET
Filed Feb. 26, 1948
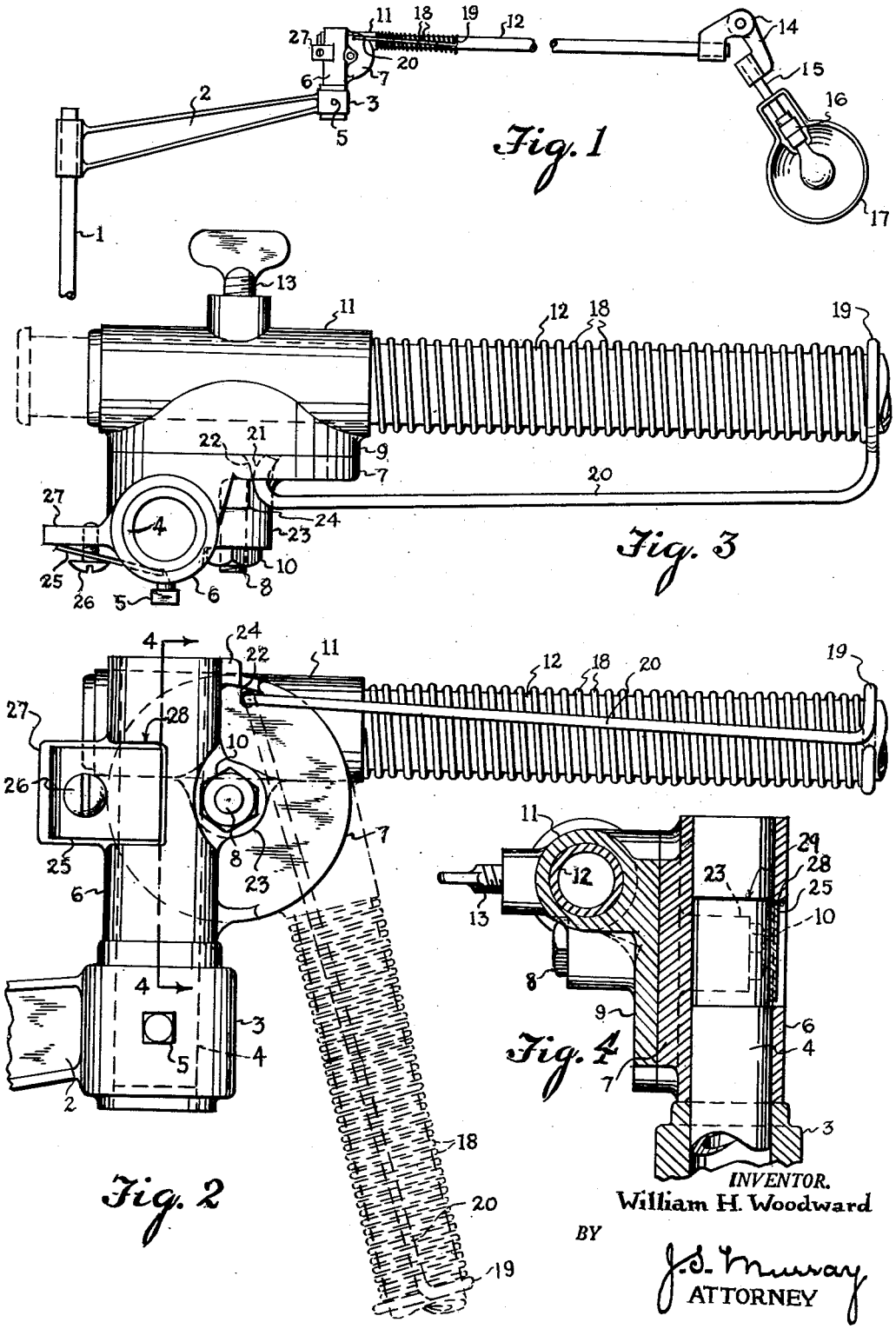
INVENTOR.
William H. Woodward
BY
J. S. Murray
ATTORNEY Patented Oct. 23, 1951

2,572,231

UNITED STATES PATENT OFFICE 2,572,231

ADJUSTABLE BRACKET

William H. Woodward, Detroit, Mich.

Application February 26, 1948, Serial No. 10,979

9 Claims. (Cl. 248—276)

1

This invention relates to adjustable brackets and particularly adjustable lamp brackets and may be regarded as an improvement on the construction shown by my Patent 2,358,844, granted September 26, 1944. In common with said patented construction my improved bracket comprises an elongated arm swively supported at one end thereof for up and down swinging, such arm carrying at its other end a lamp and a reflector for same aggregating several pounds of weight. While said bracket is designed to frictionally maintain selective up and down adjusted positions of the arm, this result has not heretofore been always achieved due to the considerable load carried by the arm and the powerful leverage exerted by such load. The practice has been to maintain a quite heavy frictional pressure at the swiveled end of the arm, and this has entailed undue exertion and wear of parts in shifting the arm up or down. In installations imposing vibration on the bracket, the arm has had a marked tendency to gradually assume a lowered position.

An object of the invention is to provide a bracket including a load-carrying arm swiveled to swing up and down, and to subject said arm to a spring counteracting the leverage applied by the load, so that the arm may be held selectively adjusted by a quite moderate frictional restraint and may be shifted with no great effort.

Another object is to so install said spring that its stress will be minimized when the bracket arm is fully raised, the stress being progressively increased as the arm is lowered.

Another object is to subject said arm to a spring for the purpose aforementioned, without interfering with longitudinal and rotative adjustments of the arm.

Another object is to mount a coiled spring on the swivelly adjustable arm and to utilize such spring in a novel manner to resist downward swinging of the arm.

These and various other objects are attained by the construction hereinafter described and illustrated in the accompanying drawing, wherein:

Fig. 1 is a side elevational view of my improved bracket, showing a horizontally adjusted position of the vertically swinging bracket arm.

Fig. 2 is an enlargement of that portion of Fig. 1 which illustrates the swivel mounting of said arm, and shows in dash lines a lowered position of the arm.

Fig. 3 is a top plan view of the construction appearing in Fig. 2.

Fig. 4 is a vertical sectional view taken on the line 4—4 of Fig. 2.

2

In these views, the reference character 1 designates a vertical post having swiveled on its upper end a laterally projecting arm 2. At its end remote from the post, said arm integrally carries a collar 3, wherein the lower end of a relatively short post 4 is rigidly secured by a set screw 5. Rotatable on the post 4 is a sleeve 6 integrally formed with a circular friction plate 7, transversely projecting from the sleeve. The plate 7 carries at its axis a bolt 8, which mounts a companion circular friction plate 9, said plates being clamped between the bolt head and a nut 10 on the bolt. Pressure under which the friction plates interengage may be regulated by adjusting the nut. The plate 9 integrally carries a sleeve 11 transverse to the common axis of the plates, such sleeve receiving an end portion of an elongated tubular arm 12, which may be fixedly held in the sleeve by a set screw 13. To the free end of the arm 12, there is adjustably coupled by fittings 14 an arm 15, mounting a lamp socket 16 and an associated reflector 17.

Since the construction described is designed primarily for heavy duty industrial use, such as the illumination of machine tools, the reflector 17 is commonly a casting, weighing at least several pounds. Hence a considerable gravitational turning moment takes effect at the pivotal end of the arm 12, and it has heretofore been necessary to maintain a rather heavy clamping stress between the friction plates 7 and 9 to avoid dropping of the arm 12. Such a stress, however, entails an excessive manual effort in vertically altering the position of said arm, particularly in an upward direction. Such installations as impose vibration on the described bracket, have occasionally been subject to a progressive sagging of the arm 12, particularly from its position shown in Fig. 1, in which the load on the arm exerts a maximum leverage. The present invention overcomes the objections above discussed by substantially counterbalancing the gravitational turning moment. Thus a spring 18 coiled on the arm 12 is compressed between the sleeve 11 and a ring 19 embracing said arm and integrally formed at one end of a wire tie member 20. The other end of said tie member is bent, as at 21, for insertion in a socket 22 formed in the plate 7 near its periphery and substantially above its axis. The socket 22 flares slightly in extending into the plate 7, and the inserted end 21 of the tie member is slightly hooked to conform to such flare, whereby the stress applied to the tie member by the spring 18 adequately retains the hooked end in said socket.

In its limiting positions of angular adjustment, the arm 12 projects upwardly and downwardly, the stress imposed on the spring 18 being a minimum in the raised limiting position of the arm and a maximum when the arm is fully lowered, as per dash line showing of Fig. 2. Progressive compression of the spring as the arm is downwardly swung follows from the fact that the spring-seating end of the sleeve 11 is at a maximum distance from the ring 19 when the arm is raised, said sleeve end being progressively shifted toward said ring as the arm swings down. This effect is evident from a comparison of the full line and dash line showings of the arm in Fig. 2. The leverage afforded the spring, in opposing the gravitational turning moment, is equal to the radial distance from the swivel axis established by the bolt 8 to the longitudinal axis of the arm 12. The gradual decrease of spring stress in raising the arm 12 from the horizontal is decidedly desirable, since magnitude of the gravitational turning moment also decreases with such movement of the arm, the arrangement maintaining a substantial balancing of forces. The further increase of spring stress in shifting the arm 12 from its full line to its dash line position (Fig. 2) is incidental and entails no detriment, since the friction between the plates 7 and 9 may easily be enough to retain the arm in any adjusted position below the horizontal, even although the spring stress somewhat exceeds the gravitational turning moment. It is here to be noted that it is rarely necessary to adjust the arm 12 at a material downward inclination. As is apparent from Fig. 2, the tie member 20 encounters a boss 23 to limit downward swinging of the arm 12, said boss also assisting in providing the plate 7 with an adequate mounting for the bolt 8. Upward swinging of the arm 12 is limited through provision on the plate 7 of a stop lug 24 engageable by said tie member.

A vital feature of the described invention is avoidance of any interference with either rotative or sliding adjustment of the arm 12. Both of these adjustments are essential to locating the lamp socket 16 exactly where it is needed and for assuring a reflection of light in an intended direction. Either of said adjustments may be readily accomplished when the set screw 13 is loosened.

Not original with this application but shown for completeness is a bowed spring plate 25 secured by a screw 26 to a lug 27 on the sleeve 6, said plate extending into a slot 28 of said sleeve and having a margin bearing firmly on the post 4 within said slot. Thus the pressure of said plate on the post may be regulated by the screw 26 to allow a swivel adjustment of the sleeve on the post, while maintaining any such selected adjustment. Said spring plate prevents escape of the sleeve from the post by engaging in a shallow annular groove 29 of the post.

What I claim is:

1. A bracket comprising a pair of correlated friction plates, means pivotally supporting one of said plates on the other, an arm carried by and projecting from the pivotal plate and substantially transverse to the pivotal axis of such plate, a load on said arm imposing a pivotal bias on the pivotal plate, the longitudinal axis of said arm being spaced from said pivotal axis, a spring coiled on said arm and having an end reacting on the pivotal plate to oppose said pivotal bias, an abutment for the other end of the spring loosely carried by the arm, and a tie member securing said abutment to the supporting friction plate.

2. In a bracket as set forth in claim 1, said tie member being stressed by said spring, means retaining the tie member in engagement with the supporting friction plate responsive to such stress.

3. A bracket as set forth in claim 1, said tie member having an end portion bent to form a ring loosely receiving said arm and serving as said abutment.

4. A bracket as set forth in claim 1, said tie member having one end portion bent to form a ring loosely receiving said arm and serving as said abutment, the other end of the tie member being bent into a socket in the supporting friction plate and forming a pivot mounting for the tie member.

5. In a bracket as set forth in claim 1, a sleeve fixed upon the pivotal friction plate and mounting said arm slidably and rotatably on such plate, and means normally holding the arm in a substantially rigid relation to said sleeve.

6. A bracket comprising an elongated arm, a pivotal support for an end portion of said arm, establishing a pivotal axis transverse to and spaced from the longitudinal axis of the arm, a load on the other end portion of the arm, imposing a gravitational bias about said pivotal axis, a spring coiled on the arm to oppose said gravitational bias, an abutment for one end of said spring disposed in proximity to and at a fixed distance from said pivotal axis, an abutment for the other end of said spring having a substantially annular form and slidably receiving the arm, a tie member connecting the last-mentioned abutment to the pivotal support and pivoted on said support to swing about an axis spaced from and parallel to the pivotal axis of the arm, and means for regulably opposing a frictional resistance to said gravitational bias.

7. In a bracket as set forth in claim 6, said arm being slidingly adjustable on said support relative to both of said abutments, and means for retaining the arm in selective positions of its sliding adjustment.

8. In a bracket as set forth in claim 6, said arm being rotatively adjustable relative to both said abutments on said support about the longitudinal axis of the arm and being further slidingly adjustable relative to both said abutments along such axis, a common means for retaining said arm in selective positions of its said rotative and sliding adjustments.

9. In a bracket as set forth in claim 6, said tie member being subjected to a longitudinal stress by said spring acting on such member through said annular abutment, and means employing such stress to maintain pivotal engagement of the tie member with said support.

WILLIAM H. WOODWARD.

REFERENCES CITED

The following references are of record in the file of this patent:

UNITED STATES PATENTS

| Number | Name | Date |
| --- | --- | --- |
| 922,204 | Smith | May 18, 1909 |
| 1,036,676 | Miller | Aug. 27, 1912 |
| 1,282,672 | Carlin | Oct. 22, 1918 |
| 1,864,756 | Pieper | June 28, 1932 |
| 2,233,300 | Trythall | Feb. 25, 1941 |
| 2,299,251 | Perbal | Oct. 20, 1942 |
| 2,358,844 | Woodward | Sept. 26, 1944 |
| 2,395,178 | Fiori | Feb. 19, 1946 |